United States Patent
Yura

[11] Patent Number: 5,821,727
[45] Date of Patent: Oct. 13, 1998

[54] INDUCTION MOTOR CONTROL UNIT

[75] Inventor: Motozumi Yura, Niwa-gun, Japan

[73] Assignee: Okuma Corporation, Nagoya, Japan

[21] Appl. No.: 843,169

[22] Filed: Apr. 14, 1997

[30] Foreign Application Priority Data

Apr. 16, 1996 [JP] Japan ..................................... 8-093813

[51] Int. Cl.[6] .................................................. H02P 7/63
[52] U.S. Cl. ........................... 318/809; 318/799; 318/801
[58] Field of Search ..................... 318/798–802, 318/804, 807–814

[56] References Cited

U.S. PATENT DOCUMENTS

| | | | |
|---|---|---|---|
| 4,418,308 | 11/1983 | Bose | 318/803 |
| 4,724,373 | 2/1988 | Lipo | 318/805 |
| 5,559,419 | 9/1996 | Jansen et al. | 318/808 |

FOREIGN PATENT DOCUMENTS

B2-7-110156  11/1995  Japan .

*Primary Examiner*—Bentsu Ro
*Attorney, Agent, or Firm*—Oliff & Berridge, PLC

[57] ABSTRACT

An induction motor controlling device realizes precise and discretional revolutional speed vector control without requiring a speed detector using an algorithm which is suitable for a system including a microcomputer.

A three-phase-to-two-phase converter detects a torque current inside a motor as a DC quantity based on instantaneous values of motor currents. A slip frequency is estimated using the torque current, and the slip estimation is used to obtain a motor's revolutional speed. An error in revolutional speed estimation is compensated by a compensation value which is obtained by amplifying an excitation current common phase voltage command.

2 Claims, 4 Drawing Sheets

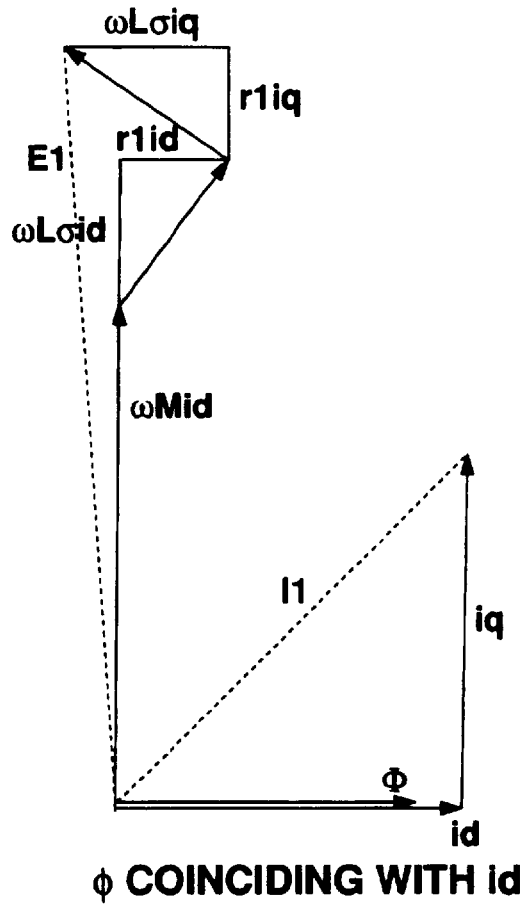
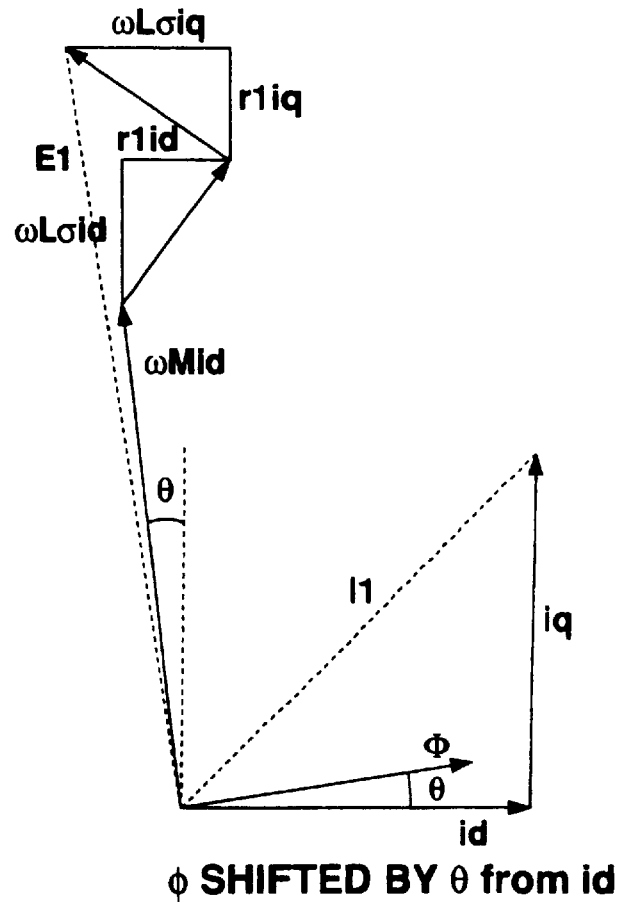
Fig. 4(a) φ COINCIDING WITH id
Fig. 4(b) φ SHIFTED BY θ from id

INDUCTION MOTOR CONTROL UNIT

BACKGROUND OF THE INVENTION

1. Field of the Invention

The present invention relates to a control unit for controlling a revolutional speed of an induction motor which is used as a spindle driving motor of a machine tool, for example. More specifically, this invention relates to a control unit that enables controlling a revolutional speed of an induction motor without a speed detector.

2. Description of the Related Art

Induction motors which have simple and durable structure and do not require replacing brushes are now widely employed instead of DC motors for machine tool spindle driving motors. A controlling method called slip frequency vector control using a speed detector attached to a spindle driving motor is often used in this kind of induction motor. However, this method requires a speed detector, which raises the cost of the entire system. This kind of system also has a problem in speed detector reliability and accuracy.

Recently, vector control without a speed detector which performs speed control of an induction motor, with high precision and at an operator's discretion, has been proposed and realized as a method of controlling an induction motor. FIG. 5 is a block diagram showing an example of a conventional control unit of such a vector control method without a speed detector.

An operation of a conventional control unit of a vector control without a speed detector is briefly explained below. A revolutional speed command $\omega m^*$ and a magnetic induction command $\phi^*$ are given as external source commands to the control unit. As will be described later in detail, a first error amplifier 25 outputs a revolutional speed estimation $\hat{\omega}m$. A second subtracter 1 subtracts the revolutional speed estimation $\hat{\omega}m$ from the revolutional speed command $\omega m^*$. This subtraction result is amplified by a revolutional speed error amplifier 2 which is a second error amplifier, and then output as a torque current command iq*. A magnetic flux value $\phi d$ output from a $\phi d/iq$ calculator 29 is subtracted from the magnetic induction command $\phi^*$ by a subtracter 30. The subtraction result is amplified by an error amplifier 31 and then output as an excitation current command id*. The torque current command iq* and the excitation current command id* are both DC quantities and are converted to ACs of frequency $\omega$ by a two-phase-to-three-phase converter 3 and vector-composed to generate motor current commands iu*, iv*, and iw*. The frequency $\omega$, an angular frequency of the motor current, is calculated using an adder 21 by addition of the revolutional speed estimation $\hat{\omega}m$ to a slip frequency command output through both a divider 17 and a converter 18. The revolutional speed estimation $\hat{\omega}m$ is calculated using the error amplifier 25 by amplifying a subtraction result by a subtracter 13 of the difference between the torque current command iq* and a torque current value iq output from the $\phi d/iq$ calculator 29. By varying the motor current angular frequency $\omega$ using the revolutional speed estimation $\hat{\omega}m$ so that the actual torque current inside the motor flows properly, a revolutional speed of the motor should be estimated as a consequence without a speed detector.

A current controller 32 performs feedback control so that motor currents iu, iv, and iw detected by current detectors 4a, 4b, and 4c correspond to the motor current commands iu*, iv*, and iw*.

The current controller 32 performs a vector control of an inverter 26 and drives an induction motor 28 by converting a DC from a DC-supply 27 to an AC.

However, conventional control units of an induction motor by a vector control without a speed detector have the following problems. The first problem is created because the current controller 32 performs feedback control of instantaneous motor currents. If the motor current is in relatively high frequencies, a prompt response is required for this feedback control. Therefore, in a system including a microprocessor and the like, processing load related to this feedback control is heavy, which hinders functions of the entire system. Furthermore, if this feedback controlling part is constituted by analogue circuits, control unit circuits become complicated. Therefore, problems occur in cost of the control unit due to a large number of components, and also in the reliability of the control unit. The second problem is that detection of a motor terminal voltage is required for very complicated calculations by the $\phi d/iq$ calculator 29.

SUMMARY OF THE INVENTION

The present invention was created to solve the problems described above. This invention enables realization of a vector control without a speed detector by a simple calculation process using a control unit comprising a microprocessor. The object of the present invention is to provide a low-price and high-reliability control unit for an induction motor.

To solve the above-mentioned problems, a control unit of an induction motor related to the present invention comprises:

an input terminal of a revolutional speed command $\omega m^*$;

an input terminal of a magnetic induction command $\phi^*$;

means for generating two-phase sinusoidal waves (22) wherein a motor current angular frequency $\phi$ is input and signals of sin $\omega t$ and cos $\omega t$ are output therefrom;

means for converting three phase to two phase (16) wherein the signals of sin $\omega t$ and cos $\omega t$, and instantaneous values of motor currents iu, iv, and iw are input and an excitation current value id and a torque current value iq are output therefrom;

means for converting three phase to two phase (3) wherein an excitation current common phase voltage command ed*, a torque current common phase voltage command eq*, and the signals of sin $\omega t$ and cos $\omega t$ are input and each phase voltage commands eu*, ev*, and ew* are output therefrom to the motor;

a first subtracter (8) which subtracts the excitation current value id from an excitation current command id* based on the magnetic induction command $\phi^*$, and obtains an excitation current error;

means for amplifying the excitation current error (9) to supply an excitation current common phase voltage command therefrom to the motor;

a second subtracter (1) which subtracts a revolutional speed estimation $\hat{\omega}m$ from the revolutional speed command $\omega m^*$, and outputs a revolutional speed error;

means for amplifying the revolutional speed error (2) to supply a torque current command iq* therefrom;

a third subtracter (5) which subtracts the torque current value iq from the torque current command iq* and supplies a torque current error therefrom;

means for amplifying the torque current error (12) to supply a torque current common phase voltage command eq* therefrom to the motor;

means for amplifying an error (23) where the excitation current common phase voltage command ed* is input and a compensation value for revolutional speed estimation is output therefrom;

means for estimating a slip frequency (6,7) wherein the torque current value iq is divided by the magnetic induction command φ*, and a slip frequency estimation ŵm is output as a product of the immediately preceding division result and a coefficient equivalent to a secondary motor resistance r2; and means for estimating a revolutional speed (19,20) wherein the compensation value for the revolutional speed estimation is subtracted from the motor current angular frequency ω, and the revolutional speed estimation ŵm is output by a subtraction of the slip frequency estimation ŵm from the result of the immediately preceding subtraction result.

Furthermore, the fourth error amplifying means (23) can output the compensation value for the revolutional speed estimation by adding a proportional component obtained by amplifying the excitation current common phase voltage command ed* and a differential component obtained by amplifying a differentiated value of the excitation current common phase voltage command ed*.

In a controlling unit for an induction motor of the present invention, the excitation current id and the torque current iq inside the motor are produced as DC quantities by a two-phase-to-three-phase converter using the instantaneous motor current values iu, iv, and iw. The torque current iq is proportional to a difference between the motor current angular frequency ω and a revolutional speed of the motor (i.e., slip frequency). Therefore, the slip frequency can be estimated by iq. By substracting the slip frequency estimation from the motor current angular frequency ω, the revolutional speed estimation should be obtained. If the obtained revolutional speed estimation contains an error, the actual excitation current inside the motor also contains an error. As a result, the excitation current common phase voltage command which is obtained by amplifying the excitation current error will change. Therefore, the compensation value for the revolutional speed estimation should be obtained by amplifying the excitation current common phase voltage command. By using the compensation value for the revolutional speed estimation and the slip frequency estimation, the estimation of the revolutional speed of the motor should be obtained in precision without a speed detector.

BRIEF DESCRIPTION OF THE DRAWINGS

FIGS. 4(*a*) and 4(*b*) are a vector diagram showing currents and a voltage of an induction motor.

DESCRIPTION OF THE PREFERRED EMBODIMENT

Figure 1:
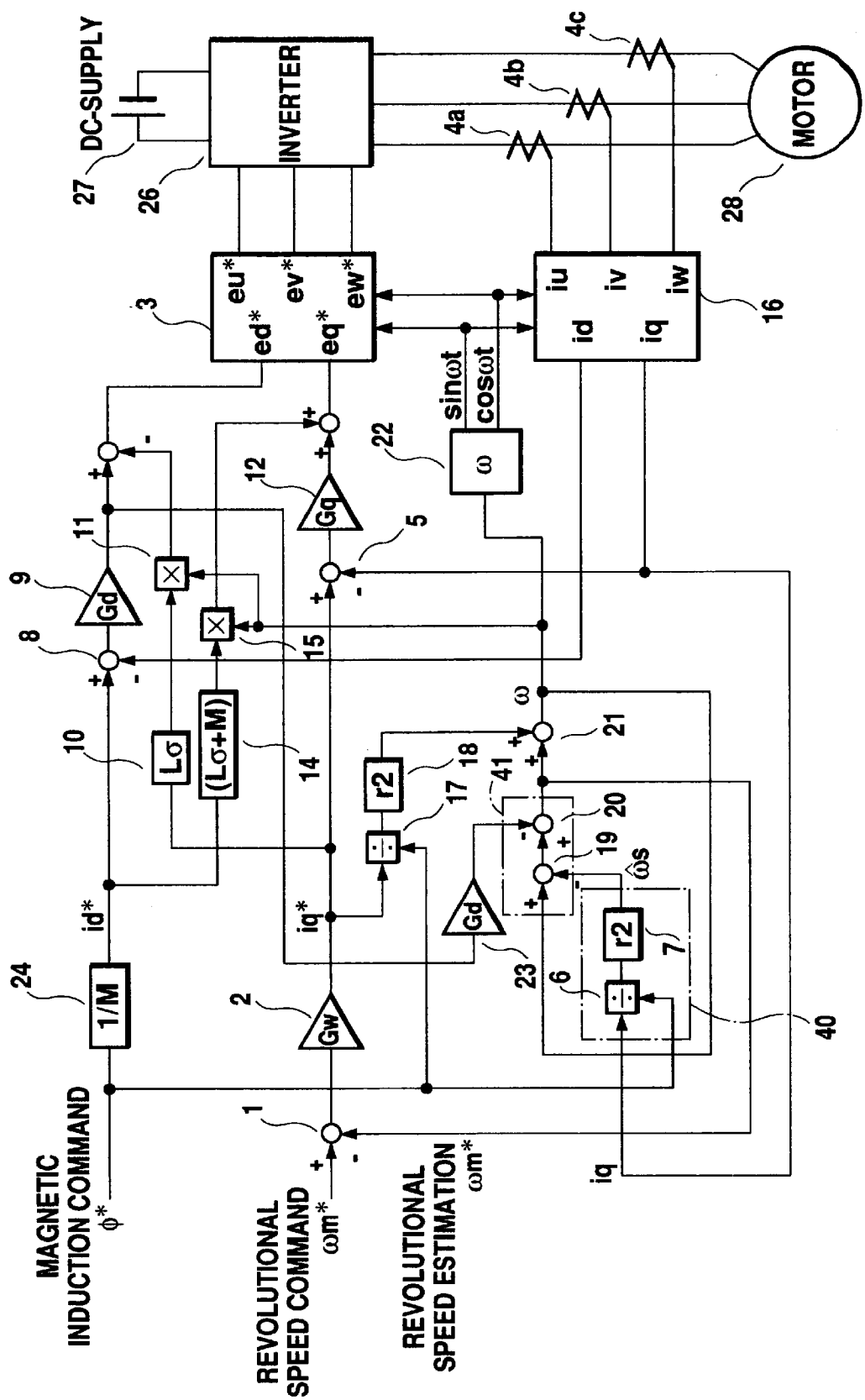
FIG. 1 is a block diagram of a control unit of an induction motor related to the present invention.
Figure 5:
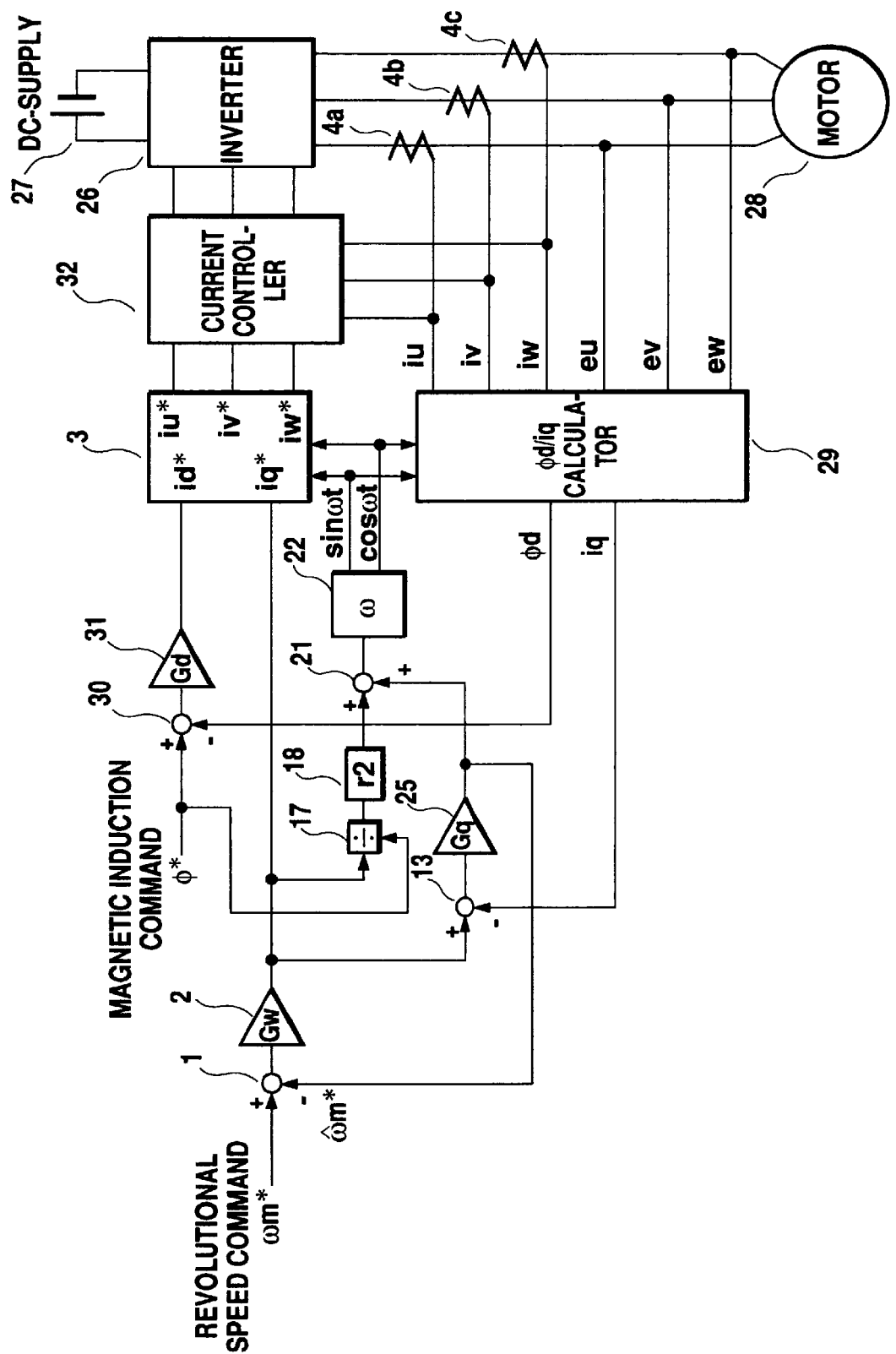
FIG. 5 is a block diagram showing an example of a conventional control unit of an induction motor.

FIG. 1 is a block diagram of a control unit for an induction motor related to the present invention. Components corresponding to components described above for FIG. 5 are given the same numeral, and their explanation is not repeated here. A two-phase-to-three-phase converter 16 in FIG. 1 calculates an excitation current i1d and a torque current i1q as follows using instantaneous values of motor currents iu*, iv*, and iw* which are obtained by current detectors 4a, 4b, and 4c, as well as signals of sin ωt and cos ωt both are generated by a two-phase sinusoidal wave generator 22. In the actual control unit, a secondary voltage and motor current could never be used. Therefore, only a primary voltage and current are operable. In FIG. 1, i1d and i1q are thus abbreviated as id and iq respectively.

$$i1d = iu \cdot \sin \omega t + iv \cdot \sin(\omega t - 120°) + iv \cdot \sin(\omega t + 120°) \ldots \quad (1)$$

$$i1q = iu \cdot \cos \omega t + iv \cdot \cos(\omega t - 120°) + iv \cdot \cos(\omega t + 120°) \ldots \quad (2)$$

Explanation of equations (1) and (2) follows below. Signals of sin ωt and cos ωt are also used by a later-described two-phase-to-three-phase converter 3 to calculate a motor terminal voltage command. The three-phase-to-two-phase converter 16 uses phases of sin ωt signals as reference phases, and three-phase motor currents are plotted on an orthogonal two-axis coordinate. Using i1d and i1q obtained as described above, explanation of a relationship between a voltage and a current of the motor is given below.

Figure 2:
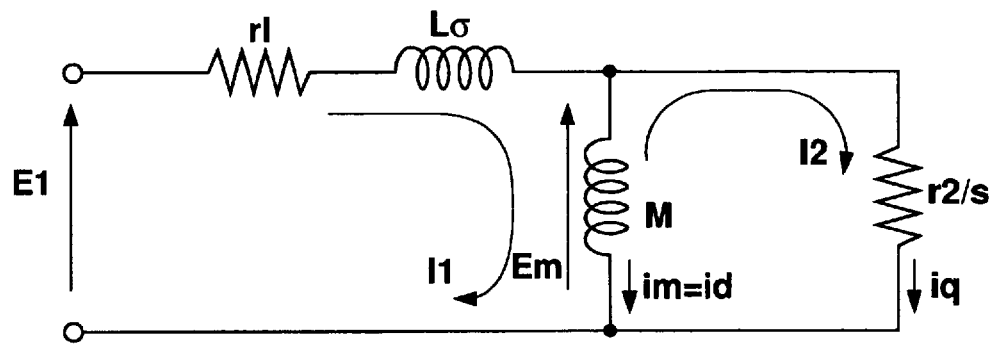
FIG. 2 is an equalizing circuit of an induction motor.

An equalizing circuit of the induction motor is shown in FIG. 2. E1, I1, and I2 respectively denote a primary terminal voltage, a primary winding current, and a secondary winding current, which are all AC quantities. Each is expressed as follows, using i1d and i1q obtained by equations (1) and (2) above.

$$I1 = i1d \cdot \sin \omega t + i1q \cdot \cos \omega t \ldots \quad (3)$$

$$I2 = i2d \cdot \sin \omega t + i2q \cdot \cos \omega t \ldots \quad (4)$$

$$E1 = e1d \cdot \sin \omega t + e1q \cdot \cos \omega t \ldots \quad (5)$$

Here, ω is an angular frequency of the motor current. Therefore, i1d, i1q, i2d, i2q, e1d, and e1q are all DC quantities which are scalars. Orthogonal coordinate axes on which they are plotted are called d-axis and q-axis.

Using the above-described i1d~e1q, the voltage and the current of the equalizing circuit in FIG. 2 are expressed as follows. Here, p is a differential operator (d/dt)

$$e1d = r1 \cdot i1d + p(L\delta + M)i1d - \omega(L\delta + M)i1q - \rho \cdot M \cdot i2d + \omega \cdot M \cdot i2q \ldots \quad (6)$$

$$e1q = \omega(L\delta + M)i1d + r1 \cdot i1q + p(L\delta + M)i1q - \omega \cdot M \cdot i2d - \rho \cdot M \cdot i2d - \rho \cdot M \cdot i2q \ldots \quad (7)$$

Figure 3:
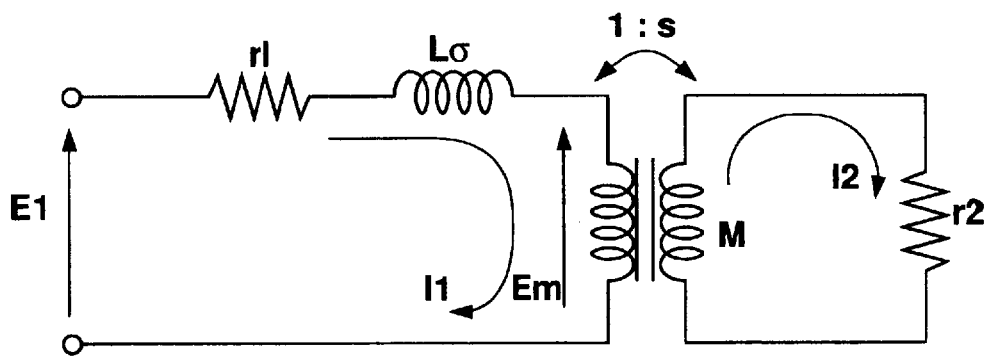
FIG. 3 is another equalizing circuit of an induction motor.

A secondary circuit is considered next. The equalizing circuit in FIG. 2 is not appropriate for considering a voltage and a current in the secondary circuit. Therefore, an equalizing circuit in FIG. 3 is used. As is obvious from FIG. 3, an induction motor is thus considered to be a voltage transforming circuit transmitting a speed electromotive force in a ratio of 1:s, when a rotor revolves with a slip frequency of ωs=s·ω, with ω being an angular frequency of the primary voltage. Therefore, voltage equations of the secondary circuit are expressed as follows.

$$r2 \cdot i2d + p \cdot M \cdot i2d + s \cdot \omega \cdot M(i1q - i2q) - \rho \cdot M \cdot i1d = 0 \ldots \quad (8)$$

$$r2 \cdot i2q + p \cdot M \cdot i2q + s \cdot \omega \cdot M(i1d - i2d) - \rho \cdot M \cdot i1q = 0$$

If a magnetic flux vector Φ inside the induction motor is assumed to coincide with the d-axis in its phase, the magnetic flux vector Φ is expressed as follows.

$$\Phi = \phi \cdot \sin \omega t \ldots \quad (10)$$

$$\phi = M \cdot i1d - M \cdot i2d \ldots \quad (11)$$

In other words, in the equalizing circuit in FIG. 2, an excitation current im that flows through an excitation inductance M is expressed as follows. The q-axis component is completely independent from the excitation current im, so the current of q-axis component may be expressed as follows.

$$im = i1d - i2d \ldots \quad (12)$$

$$i1q = i2q \ldots \quad (13)$$

By replacing equation (9) with equations (12) and (13), equation (14) is obtained.

$$r2 \cdot i1q = s \cdot \omega \cdot M \cdot im \ldots \quad (14)$$

By rewriting equation (14), equation (15) is obtained.

$$\omega s = r2 \cdot i1q/(M \cdot im) \ldots \quad (15)$$

As described above, if the magnetic flux vector $\Phi$ is assumed to coincide with the d-axis in its phase, the slip frequency $\omega s$ is found to be proportional to i1q as equation (15) shows. Therefore, by detecting i1q, the slip frequency $\omega s$ can also be detected. The divisor M·im of the equation (15) is a magnetic flux of the motor. Therefore, in this embodiment of the present invention, depicted in FIG. 1, i1q output from the three-phase-to-two-phase converter 16 is first divided by the magnetic induction command $\phi^*$ using a divider 6, then multiplied by a second resistance r2 using a converter 7 so that the slip frequency estimation $\hat{\omega}$ is obtained. In FIG. 1 the subtracter 6 and the converter 7 constitute means for estimating the slip frequency 40.

A system to control the primary motor currents of the motor i1d and i1q are considered next, based on the equations (6) and (7). First, replacing equation (6) with equations (12) and (13) makes equation (16) below.

$$e1d = (r1 + \rho \cdot L\delta)i1d - \omega \cdot L\delta \cdot i1q + \rho \cdot M \cdot im \ldots \quad (16)$$

The third term of this equation is negligible, since a change in im is slow. Therefore, equation (17) is obtained.

$$e1d = (r1 + \rho \cdot L\delta)i1d - \omega \cdot L\delta i1q \ldots \quad (17)$$

When a control system to make i1d equal to a predetermined command value i1d* is considered, a difference between i1d* and i1d, (i.e., $\Delta$i1d (=i1d*−i1d)) is output. Using this $\Delta$i1d, a d-axis voltage command e1d* is output as in equation (18).

$$e1d^* = Gd \cdot \Delta i1d - \omega \cdot L\delta \cdot i1q^* \ldots \quad (18)$$

Here, Gd is a gain using a proportional integration amplitude or the like, and Gd is not negligible. The second term controls i1q independently from i1d as will be described later. Therefore, the second term is added in a feed-forward manner as a q-axis interference term. Based on the equation (18), a first subtracter 8 calculates $\Delta$i1d (=i1d*−i1d), and a d-axis current amplifier 9, which is first amplifying means, obtains the first term of the equation (18). The second term is obtained by a product of i1q* and L$\delta$ a using a converter 10, followed by a multiplication by $\omega$ using a multiplier 11. Likewise, replacing the equation (7) by equations (12) and (13) makes the following equation (19).

$$e1q = \omega \cdot L\delta \cdot i1d + (r1 + \rho \cdot L\delta)i1q + \omega \cdot M \cdot im \ldots \quad (19)$$

When a control system to make i1q equal to i1q* is considered, as described above, the following equation (20) results from the equation (19). Here, Gq, like Gd, is not negligible, and im is replaced by i1d* because i1d is equal to im due to an assumption that i1d is constant.

$$e1q^* = Gq \cdot \Delta i1q + \omega(L\delta + M)i1d^* \ldots \quad (20)$$

In the embodiment of the present invention depicted in FIG. 1, a third subtracter 5 finds $\Delta$i1d (=i1d*−i1d) and q-axis current error amplifier 12 amplifies the gain Gq so that the first term of equation (20) is obtained by a converter 14 and a multiplier 15.

According to the equations (18) and (20), d-axis voltage command (i.e., excitation current common phase command) and q-axis voltage command (i.e., torque current common phase voltage command), both should be supplied to a first winding of the induction motor, are determined.

The following conversions are performed on the above-described command values by the two-phase-to-three-phase converter 3, and used to determine three phase AC voltage commands eu*, ev*, and ew* which should be supplied to the primary winding of the induction motor.

$$eu^* = e1d^* \cdot \sin\omega t + e1q^* \cdot \cos\omega t \quad (21)$$

$$ev^* = e1d^* \cdot \sin(\omega t - 120°) + e1q^* \cdot \cos(\omega t - 120°) = \quad (22)$$

$$(-e1d^*/2 + \sqrt{3}/2 \cdot e1q^*)\sin\omega t +$$

$$(-\sqrt{3}/2 \cdot e1d^* - e1q^*/2)\cos\omega t$$

$$ew^* = e1d^* \cdot \sin(\omega t + 120°) + e1q^* \cdot \cos(\omega t + 120°) = \quad (23)$$

$$(-e1d^*/2 - \sqrt{3}/2 \cdot e1q)\sin\omega t +$$

$$(\sqrt{3}/2 \cdot e1d^* - e1q^*/2)\cos\omega t$$

An inverter 26 can control the primary currents i1d and i1q at predetermined values by supplying voltages equivalent to the commands eu*, ev*, and ew* to the induction motor 28.

The equations (18) and (20) show that the primary currents i1d and i1q should be controlled by changing the primary voltages discretionally. Equations (12) and (13) are prerequisites to realize this control of i1d and i1q. To satisfy equations (12) and (13), it is necessary for the magnetic flux vector $\Phi$ inside the induction motor to coincide with the d-axis in phase. If no coincidence occurs, it is impossible to estimate the slip frequency using equation (15). In this case, estimation of the revolutional speed is not performed, and thus control of the revolutional speed is not carried out. If the magnetic flux vector $\Phi$ inside the induction motor does not coincide with the d-axis in phase, an effect on output from the d-axis current error amplifier 9 is next considered. FIG. 4(a) is a vector diagram to show the currents and the voltage inside the induction motor in a case of $\phi$ coinciding with the d-axis, while FIG. 4(b) shows a case of $\phi$ shifted by $\theta$ from the d-axis. If $\theta$ is small enough, the magnetic flux inside the motor is thought to be generated solely by i1d, and a speed electromotive voltage vector Em generated by this magnetic flux is expressed as follows.

$$\begin{aligned} Em &= emd + j \cdot emq \\ &= \omega \cdot M \cdot i1d(\sin\theta + j \cdot \cos\theta) \end{aligned} \quad (24)$$

Since $\theta$ is assumed to be sufficiently small, $\cos\theta$ and $\sin\theta$ in equation (24) maybe approximated by 1 and $\theta$ respectively. The d-axis and q-axis components are expressed as follows:

$$emq = \omega \cdot M \cdot i1d \ldots \quad (25)$$

$$emd = \omega \cdot M \cdot i1d \cdot \theta \ldots \quad (26)$$

The voltage expressed by equation (25) is exactly the same as the expected speed electromotive voltage. Therefore, $\theta$, the difference between the magnetic flux vector $\Phi$ and the d-axis, does not have any significant influence on a q-axis component of the speed electromotive voltage emq. However, a d-axis component emd expressed by the equation (26) shows that a voltage proportional to θ will be generated. Such voltage should not be generated in a case of coinciding φ with d-axis. The d-axis component emd expressed by equation (26) is generated onto the output from the d-axis current error amplifier 9 in the control unit shown by FIG. 1. The output from the d-axis current error amplifier 9 is then amplified by an error amplifier 23 so that a compensation value for the revolutional speed estimation is obtained. The compensation value for the revolutional speed estimation is supplied to a subtracter 20 to compensate the revolutional speed estimation ω̂m. By monitoring the compensation value for the revolutional speed estimation so that the output from the d-axis current error amplifier 9 is kept zero, the difference θ between the magnetic flux vector Φ and d-axis should be nullified. However, the output from the d-axis current error amplifier 9 has a DC current component attributed to dead times of the inverter 26. Therefore, if the gain of the error amplifier 23 is large enough, the revolutional speed estimation will become unstable. Thus, in the present embodiment, the error amplifier 23 comprises in combination of so-called P-amplifier, which simply amplifies an input, and D-amplifier, which amplifies differentiated values of the input.

The revolutional speed estimation ω̂m is obtained in the subtracter 19 by subtracting the above-described estimation of the slip frequency ω̂s from the current angular frequency of the motor ω. The current angular frequency ω is obtained by an addition, performed by an adder 21, of the slip frequency command ωs* and the revolutional speed estimation ω̂m compensated by the subtracter 20. The slip frequency command ωs* is calculated by a division, performed by a divider 17, of a torque current command iq* by a magnetic induction command φ*, followed by a product, performed by the converter 18, of the preceding division result and a secondary resistance r2 of the motor. In FIG. 1, subtracters 19 and 20 constitute means for estimating the revolutional speed 41.

According to the present invention described above, vector control of a revolutional speed of an induction motor without using a speed detector, as well as discretional and highly precise control of a motor current, can be realized using an algorithm suitable for a system which includes a microcomputer. Therefore, an induction motor controlling device, lower in price and higher in reliability, can be provided.

While there has been described what is at present considered to be a preferred embodiment of the invention, it will be understood that various modifications can be made thereto, and it is intended that the appended claims cover all such modifications as fall within the true spirit and scope of the invention.

What is claimed is:

1. An induction motor control unit comprising:

an input terminal of a revolutional speed command ωm*;

an input terminal of a magnetic induction command φ*;

a two-phase sinusoidal wave generator (22) wherein a motor current angular frequency ω is input and signals of sin ωt and cos ωt are output therefrom;

a three-phase-to-two-phase converter (16) into which the signals of sin ωt and cos ωt, and instantaneous values of motor currents iu, iv, and iw are input and from which an excitation current value id and a torque current value iq are output;

a three-phase-to-two-phase converter (3) to which an excitation current common phase voltage command ed*, a torque current common phase voltage command eq*, and the signals of sin ωt and cos ωt are input and from which each phase voltage commands eu*, ev*, and ew* are output to the motor;

a first subtracter (8) which subtracts the excitation current value id from an excitation current command id* based on the magnetic induction command φ*, and obtains an excitation current error;

a first error amplifier (9) wherein an excitation current error is input, and the excitation current common phase voltage command is supplied therefrom to the motor;

a second subtracter (1) which subtracts a revolutional speed estimation ω̂ from the revolutional speed command ωm*, and outputs a revolutional speed error;

a second error amplifier (2) wherein the revolutional speed error is input and a torque current command iq* is output therefrom;

a third subtracter (5) which subtracts the torque current value iq from the torque current command iq* and supplies a torque current error;

a third error amplifier (12) wherein the torque current error is input and the torque current common phase voltage command eq* is output therefrom to the motor;

a fourth error amplifier (23) where the excitation current common phase voltage command ed* is input and a compensation value for revolutional speed estimation is output therefrom;

a slip frequency estimater (6,7) wherein the torque current value iq is divided by the magnetic induction command φ*, and a slip frequency estimation ω̂s is output as a product of the immediately preceding division result and a coefficient equivalent to a secondary motor resistance r2; and a revolutional speed estimater (19,20) wherein the compensation value for the revolutional speed estimation is subtracted from the motor current angular frequency ω, and the revolutional speed estimation ω̂s is output by a subtraction of the slip frequency estimation ω̂s from the result of the immediately preceding subtraction result.

2. The induction motor control unit as claimed in claim 1 wherein the fourth error amplifier (23) can output the compensation value for the revolutional speed estimation by adding a proportional component obtained by amplifying the excitation current common phase voltage command ed* and a differential component obtained by amplifying a differentiated value of the excitation current common phase voltage command ed*.

* * * * *